US009928665B2

(12) United States Patent
Li

(10) Patent No.: US 9,928,665 B2
(45) Date of Patent: Mar. 27, 2018

(54) METHOD AND SYSTEM FOR EDITING SCENE IN THREE-DIMENSIONAL SPACE

(71) Applicant: FRAMY INC., Grand Cayman (KY)

(72) Inventor: Yu-Hsien Li, Taipei (TW)

(73) Assignee: FRAMY INC., Grand Cayman (KY)

( * ) Notice: Subject to any disclaimer, the term of this patent is extended or adjusted under 35 U.S.C. 154(b) by 0 days.

(21) Appl. No.: 15/154,376

(22) Filed: May 13, 2016

(65) Prior Publication Data
US 2017/0256099 A1 Sep. 7, 2017

(30) Foreign Application Priority Data
Mar. 7, 2016 (TW) .............................. 105106885 A

(51) Int. Cl.
*G06T 17/00* (2006.01)
*G06T 19/20* (2011.01)
*G06F 3/01* (2006.01)

(52) U.S. Cl.
CPC .............. *G06T 19/20* (2013.01); *G06F 3/017* (2013.01); *G06T 2219/2016* (2013.01)

(58) Field of Classification Search
None
See application file for complete search history.

(56) References Cited

U.S. PATENT DOCUMENTS

| 2002/0140666 | A1* | 10/2002 | Bradski | G06F 1/1626 345/156 |
| 2012/0038626 | A1 | 2/2012 | Kim | |
| 2012/0268410 | A1 | 10/2012 | King et al. | |
| 2013/0222385 | A1 | 8/2013 | Dorsey et al. | |
| 2013/0314406 | A1* | 11/2013 | Lin | G06T 15/20 345/419 |
| 2014/0232634 | A1* | 8/2014 | Piemonte | G06F 3/04815 345/156 |
| 2015/0066439 | A1* | 3/2015 | Jones | G06F 17/50 703/1 |
| 2015/0077525 | A1* | 3/2015 | Fujiwara | H04N 13/0221 348/50 |

(Continued)

FOREIGN PATENT DOCUMENTS

| EP | 2977961 A1 | 1/2016 |
| KR | 1020130127303 A1 | 11/2013 |
| KR | 1020140068416 A1 | 6/2014 |

*Primary Examiner* — Andrew G Yang
(74) *Attorney, Agent, or Firm* — Li & Cai Intellectual Property (USA) Office

(57) ABSTRACT

The disclosure is related to a method and a system for editing a scene in a three-dimensional space. The related technology allows a user to operate a smart device to decide an editing position within a 3D space intuitively, in which the system acquires positioning signals within the 3D space by the device's sensor. A touch panel allows the user to edit the object in the space. A software-implemented means is provided to record the movement and change of the object in the space in addition to recording its position, size, rotary angle, or orientation. An animation within the 3D space is created. For playback, the movement and change of one or more objects within a three-dimensional scene can be reproduced in response to the user's operation using the smart device within the 3D space. The invention implements an intuitive way for editing the scene of the 3D space.

10 Claims, 9 Drawing Sheets

(56) References Cited

U.S. PATENT DOCUMENTS

| | | | |
|---|---|---|---|
| 2015/0097862 A1* | 4/2015 | Reisner-Kollmann | G06T 19/006 345/633 |
| 2015/0138192 A1* | 5/2015 | Marchenko ............. | G06F 3/048 345/419 |
| 2015/0170260 A1* | 6/2015 | Lees ................... | G06Q 30/0643 705/27.2 |
| 2015/0227285 A1 | 8/2015 | Lee et al. | |
| 2015/0253908 A1* | 9/2015 | Go .......................... | G06F 3/046 345/173 |
| 2015/0363980 A1 | 12/2015 | Dorta et al. | |
| 2016/0048942 A1* | 2/2016 | Irie ....................... | G06F 3/0488 345/619 |
| 2016/0148430 A1* | 5/2016 | Lin ....................... | G06T 19/006 345/420 |

\* cited by examiner

METHOD AND SYSTEM FOR EDITING SCENE IN THREE-DIMENSIONAL SPACE

BACKGROUND OF THE INVENTION

1. Field of the Invention

The present invention is generally related to a technology for editing a scene in a three-dimensional space, in particular to a method and a system of utilizing a smart device to edit an object in the scene within the three-dimensional space.

2. Description of Related Art

In a conventional three-dimensional virtual space, a technology of computer image processing is generally used to render the various pictorial objects within the three-dimensional space. This kind of three-dimensional virtual scene allows a user to view every visual angle of the pictorial object(s) within the 3D space, unlike the ordinary viewing experience of images in a plane space.

Nevertheless, the generation of the pictorial objects within the mentioned three-dimensional virtual space requires a computer technology with a proprietary software program that performs coordinates transformation to create the virtual objects within the 3D space. More, a special player is required to playback the three-dimensional virtual images. It is noted that the conventional technology for editing the pictorial object(s) for the 3D space is difficult and unwieldy for ordinary people.

SUMMARY OF THE INVENTION

The present invention is generally related to a method for editing a scene within a three-dimensional space and a system for implementing the method. One of the objectives of the present invention is allowing a user himself to operate a smart device to edit the scene within a three-dimensional space intuitively. The scene may have one or more pictorial objects that are edited by the scheme. The user may handheld the smart device to decide an editing position within the space. A software program in the system is used to acquire positioning signals generated by a sensor of the smart device in the three-dimensional space. A touch-sensitive screen of the smart device allows the user the edit the objects. The software program can be used to record any movement or variation of the pictorial object besides the object's position, size, rotary angle and its orientation. Therefore, an animated image within the three-dimensional scene is created.

According to one of the embodiments of the present invention, the method for editing the scene within the three-dimensional space is described as follows. A smart device is moved to generate positioning signals within the three-dimensional space. One object is introduced at this current position, such as a first position in the three-dimensional space. The smart device is used to edit the object so as to define a status of the object at the first position. The status is such as the object's size, rotary angle and its orientation. The status of the object at the first position in the three-dimensional space is stored.

In one further embodiment of the present invention, while the object is edited, the smart device can be moved to another position, defined as a second position. The movement of the smart device renders a moving track of the object from the first position to the second position. Then continuous statuses are formed, and the moving track may be stored in the system.

In one further embodiment, multiple objects can be introduced to the three-dimensional space. The editing made to every object is described as in the forgoing description. The smart device is moved to generate positioning signals within the three-dimensional space. A first object is introduced at the first position so as to define the status of the first object at the first position. While the smart device is moved to the second position, the movement and variation of the object can be controlled. The continuous variations during the movement of the object, and its moving track are stored in the system.

A second object is next introduced to the three-dimensional space. The smart device is moved in the three-dimensional space from a third position to a fourth position. The movement of the second object renders a second moving track. Simultaneously, the status of the second object can be changed. The continuous statuses and the second moving track are stored in the system.

Last, the conditions for triggering the first object and the second object to be played can be configured.

According to one of the embodiments of the system for editing the scene in the three-dimensional space, the primary components of the system are such as a 3D space positioning module that is used to acquire the positioning signals of the smart device within the three-dimensional space; an image processing module that is used to process the pictorial objects in the three-dimensional space and the three-dimensional scene, and a displayed image is generated in response to the positioning signals generated by the smart device; a display module that is used to output the displayed image in the three-dimensional space; a touch-sensitive module that is used to provide a user interface allowing operating the pictorial object so as to define status of the pictorial object in the space; and a storage module that is essentially used to store statuses of the pictorial object and the three-dimensional scene.

The system for editing the scene within the three-dimensional space further utilizes a memory of the smart device to store an editing instruction set and a playback instruction set. The instruction set includes instruction for gaining positioning signals generated by the smart device within the three-dimensional space; instruction for displaying the three-dimensional scene in response to the positioning signals; instruction for editing status of the pictorial object at different positions and a moving track; instruction for recording change of statuses of the pictorial object at different positions and the moving track; instruction for setting condition for triggering the pictorial object to be played in reproduction; and instruction for triggering the pictorial object for reproduction.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The disclosure of the present invention relates to a method for editing a scene within a three-dimensional space and a system thereof. The invention is directed to a technology that is implemented by a software program executed by a smart device, especially a handheld device. The software program allows a user to edit various static or animated objects (3D objects) intuitively. In particular, the user can operate the smart device to move in the three-dimensional space so as to decide an editing position. In the meantime, the system can acquire positioning signals generated by a kind of space sensor such as a gyroscope installed in the smart device. Further, the user can edit the object through a touch screen of the smart device. The user can edit position, size, rotary angle, and/or orientation of the object. A software-implemented scheme is provided to record movement and change of the object in the three-dimensional scene so as to create an animation within the three-dimensional scene. While the animation is reproduced in the three-dimensional scene, the player can reproduce the recorded movement and variation of the object (one or more) within the three-dimensional scene according to the positioning signals made by the user operating the smart device.

Figure 1A:
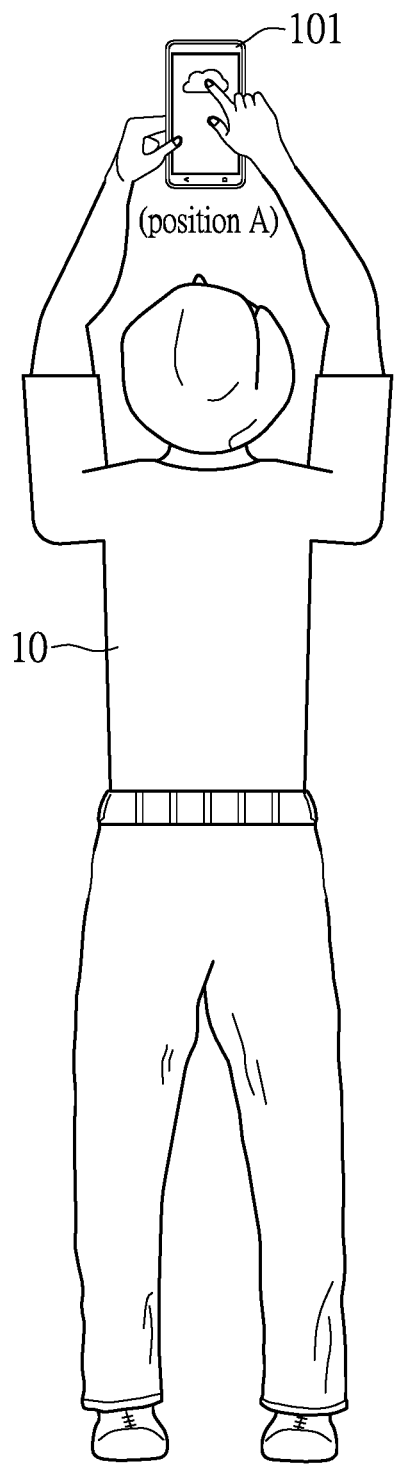
FIG. 1A and FIG. 1B show schematic diagrams depicting a circumstance allowing a user to operate a smart device to edit a scene within a three-dimensional space in accordance with the present invention.
Figure 1B:
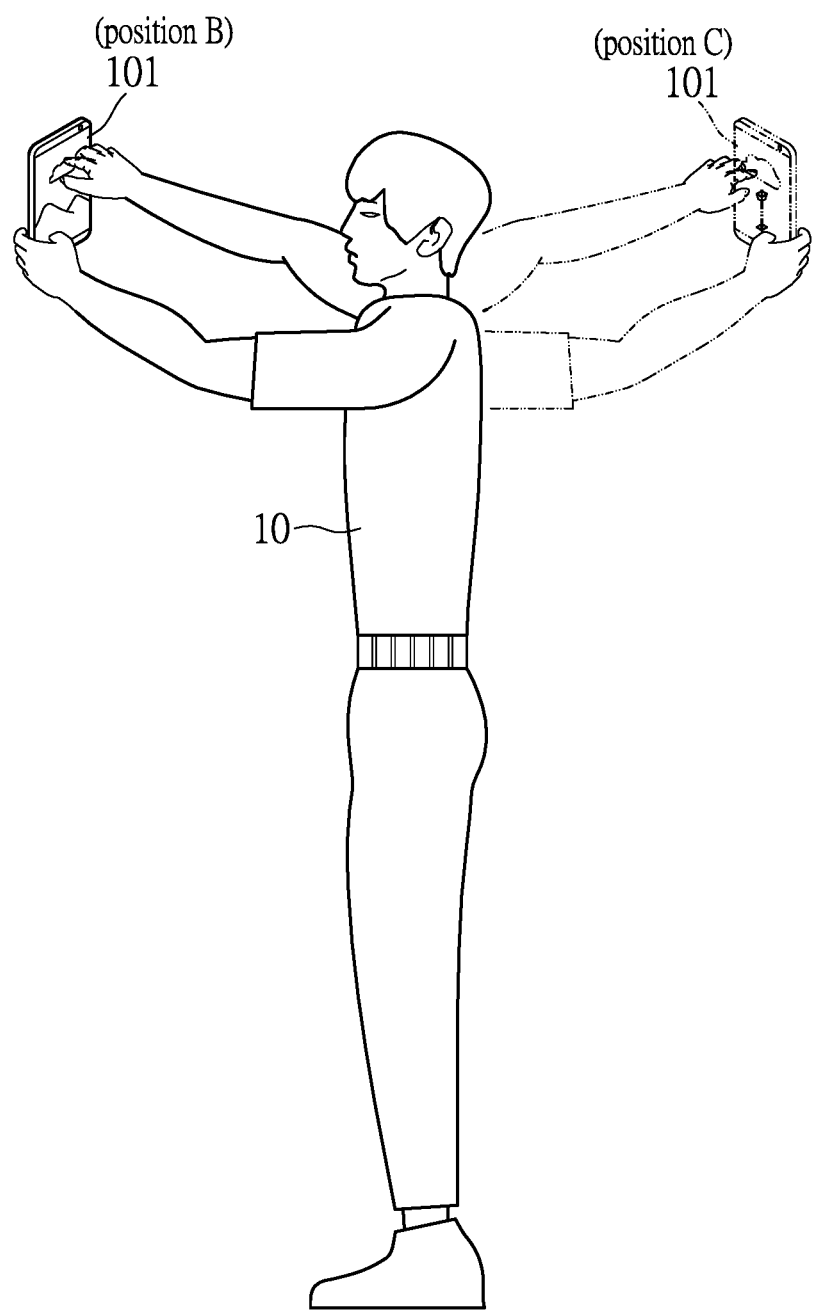

References are made to FIG. 1A and FIG. 1B schematically depicting a circumstance where the user edits a pictorial object within the three-dimensional space intuitively. In this exemplary circumstance, a user 10 can edit the pictorial object within the three-dimensional space using a smart device 101 that is moved to any position. A 3D scene editing program is installed in the smart device 101. The program can be a kind of mobile software program, i.e. APP. A 3D scene can be first introduced before the object is edited. The scene is such as a three-dimensional scene that covers every corner of a 360-degree three-dimensional space. The smart device 101 has a display screen that is used to show a corresponding scene image in response to the positioning signals generated by the smart device. It is worth noting that size or resolution of the display screen of the smart device 101 can affect the image to be viewed from a specific direction. Alternatively, the user may also decide a proportion of the image to be viewed using the display screen. The user can resize the object shown in the space, and also control the proportion of the scene to be displayed.

FIG. 1A schematically shows a user 10 moving a smart device 101 above their head, i.e. a position A, for the purpose of editing. A touch screen of the smart device 101 acts as a user interface for the user to edit the scene. The display screen currently displays the portion of the whole three-dimensional scene corresponding to the area around the top of the user's head. The user is also a viewer. The image to be displayed on the display screen is based on the size and resolution of the display screen of the smart device 101, and also the user's preference regarding the display ratio.

In the present embodiment, the position A above the user's head becomes an editing position. An editing program executed in the smart device allows the user 10 to see the image at the position A with an orientation in the three-dimensional scene. In the meantime, a pictorial object is introduced through a software tool. The pictorial object can be a static or animated image. At the position A, the user 10 can define status of the pictorial object at the position A. The status of the object is such as the object's size and rotary angle. The object can be a three-dimensional object, and the status can associate to its orientation.

In one further embodiment, the status of the object at the position A can be continuously changed in a period of time. With the user 10 operates the smart device 101 to define status of the object at the position A, the variations of status of the object at the position A within a period of time are recorded. It is noted that the variations of the size, rotary angle and/or orientation of the object form a series of continuous changes.

In one further embodiment of the present invention, the three-dimensional scene is not necessarily introduced with the object edited until the editing is finished. The last composition of the object and the scene is created when the three-dimensional scene is synced.

In FIG. 1B showing a circumstance where the user 10 holds the smart device 101 at one of two horizontal positions such as the left position B and the right position C for editing.

The circumstance shows the user 10 holding the smart device 101 in one hand to move within three-dimensional space, and an editing program executed in the smart device 101 gains the positioning signals when the smart device 101 is at the position B in order to edit the object. It is noted that the positioning signals are generated by a gyroscope in the smart device 101. The display screen displays a portion of the 3D scene corresponding to a specific range derived by the positioning signals. A specific status of the object is defined at the position B. Similarly, the status of the object can also be defined at the position C when the user 10 moves the smart device 101 to the position C. Meantime, the editing program can acquire the positioning signals with respect to this position C, and accordingly the display screen of the smart device 101 displays the portion of the 3D scene corresponding to the range around the position C. The user 10 can edit the scene around the position C intuitively.

Based on the above-mentioned circumstance, the 3D scene can be introduced simultaneously or after the object is edited. The three-dimensional scene is such as a virtual-reality image. The scheme allows the user 10 to operate the smart device 101 for up-to-bottom or left-to-right movement within the space. Through the display screen of the smart device 101, the user 10 can see the scene toward every orientation. In one further embodiment, when the object is edited using the smart device 101, the smart device 101 with a camera module is used to capture the real three-dimensional image around the user 10. Therefore, the scheme also allows the user 10 to edit the pictorial object in a real scene. The real scene and the virtual reality image can be integrated.

Figure 2A:
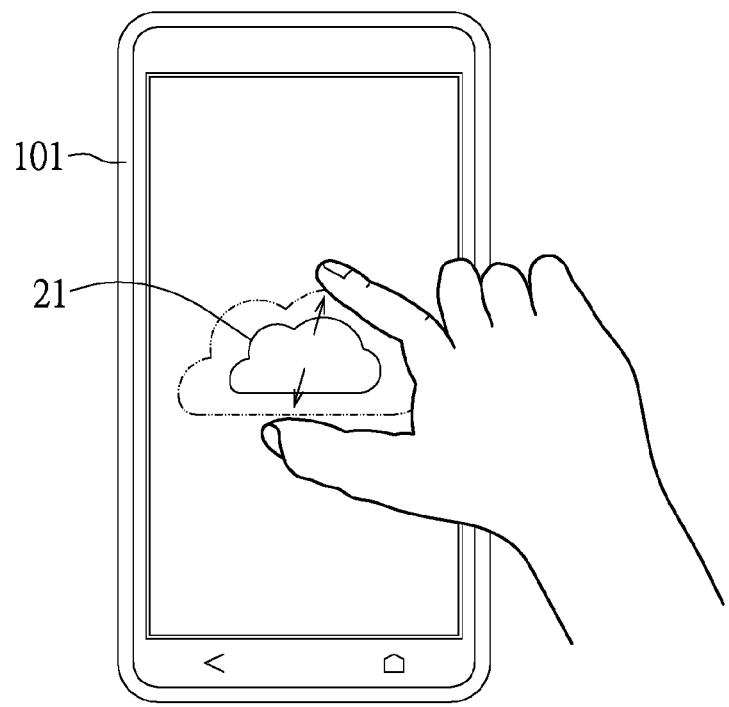
FIG. 2A shows a schematic diagram depicting a circumstance that a user operates a smart device to resize an object within a three-dimensional space in accordance with the present invention.

FIG. 2A next shows a circumstance in which the user operates the smart device to resize the pictorial object in the 3D space. The user 10 directly manipulates the smart device 101, for example, the user's finger can touch the device's touch screen to edit an object 21. The embodiment shows the user 10 moving his fingers to resize the pictorial object 21 using the touch screen at a spatial position within the three-dimensional scene. The touch signals generated by the user's operation render the status of the object within the three-dimensional space, e.g. the size of the object within the displayed scene.

Figure 2B:
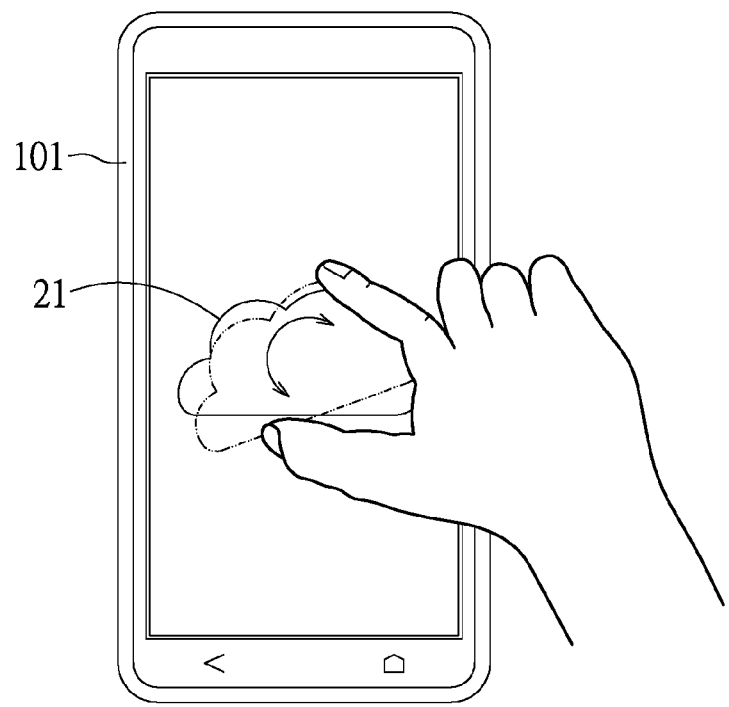
FIG. 2B shows a schematic diagram depicting a circumstance that a user operate a smart device to rotate an object within a three-dimensional space in accordance with the present invention.

FIG. 2B shows a schematic diagram depicting a circumstance in which the user operates the smart device to rotate the object. The user's fingers are allowed to touch the touch screen of the smart device 101 for rotating the object 21. The operation made to the smart device 101 generates the touch signals so as to control the rotary angle of the object 21. The rotary angle of the object at this position is therefore determined.

Figure 2C:
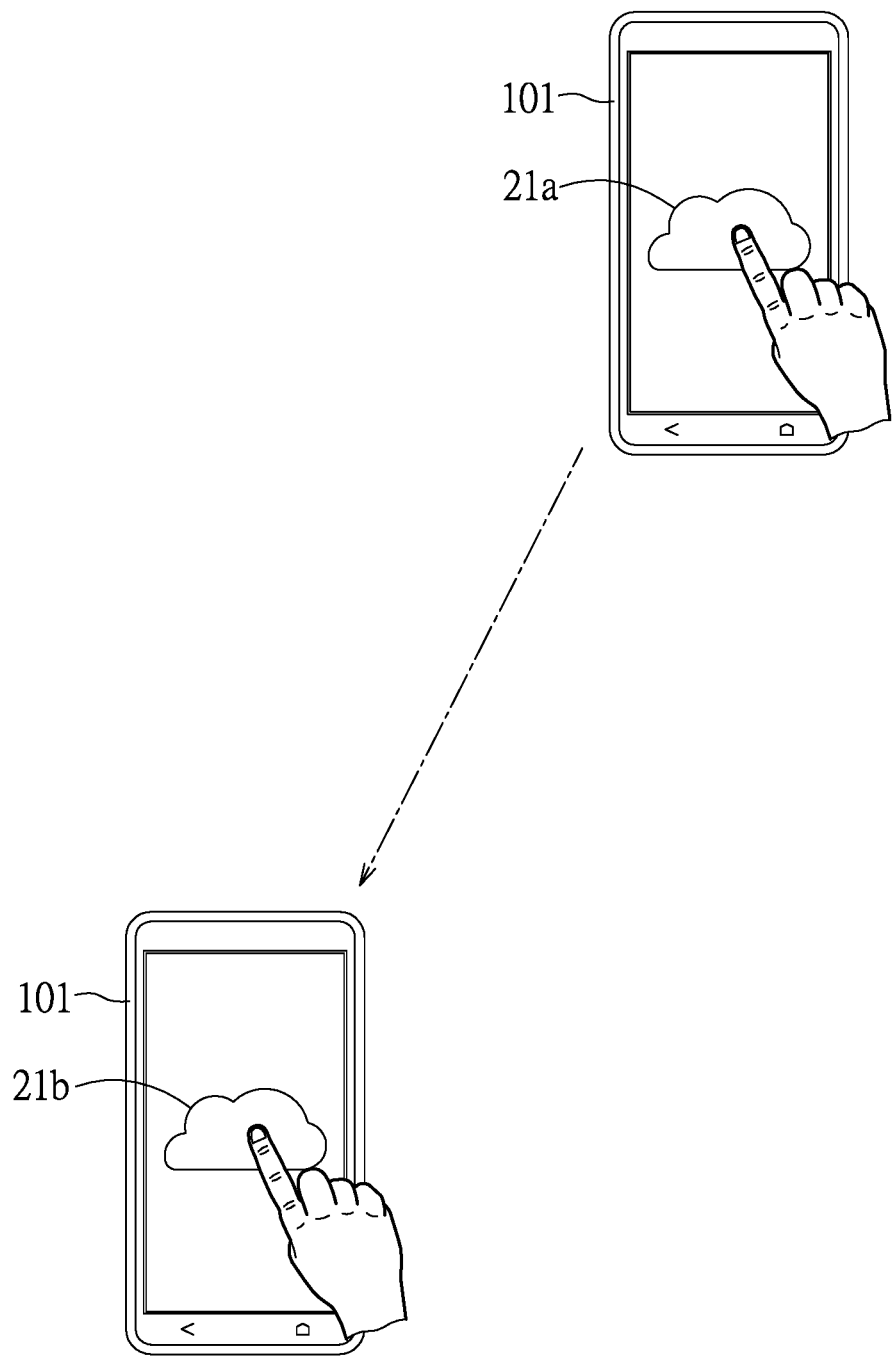
FIG. 2C shows a schematic diagram depicting a circumstance that a user operate a smart device to move an object within a three-dimensional space in accordance with the present invention.

FIG. 2C shows another schematic diagram depicting a circumstance where the user operates the smart device to edit movement of the object. The user 10 first moves the smart device 101 to a first position within a three-dimensional space and draws an object into the space. The figure shows a first positioning object 21a is at the first position. Next, the user holds the object at a specific position on the display screen, e.g. the object is pressed by the user's finger at the position over the screen. The user then moves the smart device 101 to a second position within this 3D space, and the object becomes a second positioning object 21b shown in this diagram at this moment. This editing action forms a moving track when the object pressed by the user's finger is moved from the first position to the second position in this 3D space. The moving track indicates the object moved from the first position to the second position within this three-dimensional space.

The above-mentioned schematic diagrams depict the embodiments of the present invention that allow the user to operate the smart device 101 to move within the three-dimensional space and edit the object intuitively. The user can first decide the size, rotary angle, or orientation of the object at a specific position within the 3D space since the object is fixed at the position by holding the smart device at the position for editing. The moving track of the object can be defined by moving the smart device 101 within this 3D space. During the movement of the object in the space, the status including size, rotary angle and/or orientation of the object can also be defined. Moving the smart device 101 means changing the device's position. A program is provided to record the whole procedure so as to form an animation within the three-dimensional scene.

Figure 3:
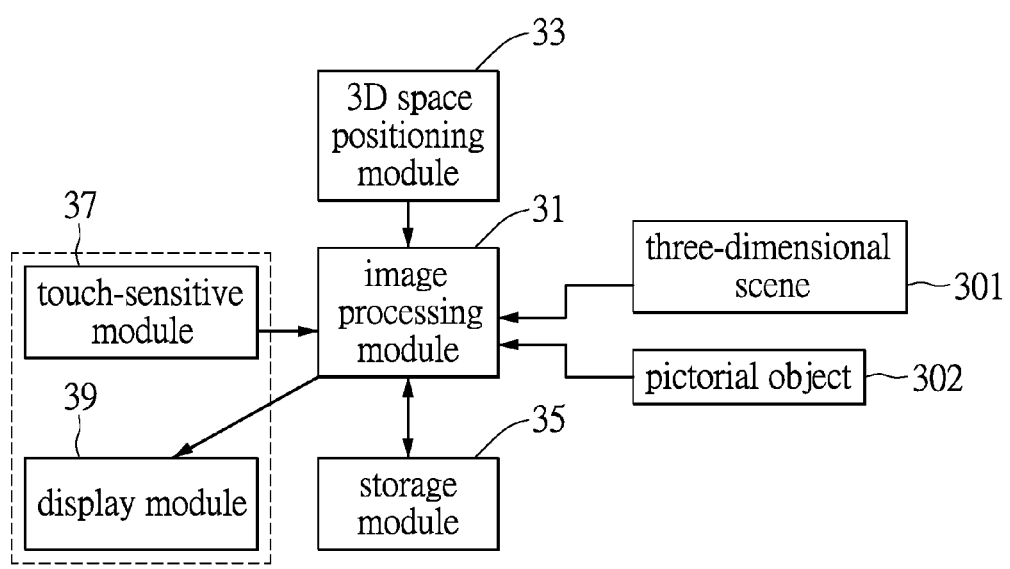
FIG. 3 shows a diagram of functional modules implementing the method for editing a scene within a three-dimensional space according to one embodiment of the present invention.

In one of the embodiments, a software and/or hardware-implemented system realizes the method for editing a scene within a three-dimensional space in accordance with the present invention. The system can be applied in a smart device. Reference is made to FIG. 3 showing the functional modules implementing the system.

According to one embodiment described in this figure, the method for editing a scene within a three-dimensional space includes a 3D space positioning module 33 that is used to acquire positioning signals generated by a smart device in the three-dimensional space. For example, a gyroscope installed in the smart device can be used to sense the locality of the smart device in the three-dimensional space so as to generate the 3D-space positioning signals.

The system includes an image processing module 31 that is used to process the image of a 3D scene displayed in the display screen of the smart device, such as a three-dimensional scene 301 and a pictorial object 302. When the 3D scene is reproduced, the positioning signals generated by the smart device are referred to for generating a displayed image of the three-dimensional scene. The pictorial object 302 denotes one or more objects to be edited. The user operates the smart device for defining status of every object in the space. The images with respect to various statuses of the objects are finally combined with the three-dimensional scene 301.

The system includes a display module 39 that is used to output the displayed images in the three-dimensional space. The display module 39 includes a display screen of the smart device. The system includes a touch-sensitive module 37 which is used to render a user interface for the user to operate the pictorial object. For example, the touch-sensitive module 37 allows the user to edit the scene and the object by touching the screen. The operations render the various statuses of every pictorial object within the three-dimensional space, as shown in FIG. 2A through FIG. 2C. The system includes a storage module 35 that is used to store the three-dimensional scene and the status for every pictorial object in every timing and position within the three-dimensional space after editing.

According to one of the embodiments, the software or hardware-implemented system for editing the 3D scene is implemented by means of a series of instructions that are stored in a memory of the smart device. The instructions can be categorized into an editing instruction set and a playback instruction set. The instruction sets can be integrated into one single software or by different programs.

The instruction set includes instruction for gaining positioning signals generated by the smart device within the three-dimensional space, and the positioning signals are provided for the program to position the smart device, for the user to edit the object, and for the system to play the corresponding images.

The instruction set includes instructions for displaying the three-dimensional scene in response to the positioning signals, and also generating the images toward a specific orientation with respect to the signals. It is noted that the size and resolution of the display screen affects the range to display the scene in the three-dimensional space. A proportional relationship exists between the displaying range and the whole scene, and the proportion there-between may be chose by the user.

The instruction set includes instruction for editing status of the pictorial object at different positions and a moving track. The program in the smart device can acquire the status of the object and its movement in the editing process according to the touch signals generated by the smart device operated by the user and the positioning signals due to the movement of the smart device.

The instruction set includes instructions for recording change of statuses of the pictorial object at different positions and the moving track, and also the moving track within the 3D scene. By this instruction, the touch signals and the positioning signals generated by the smart device operated by the user are simultaneously recorded when the user changes the status of the object and moves the smart device.

The instruction set includes instructions for setting the conditions for triggering the pictorial object to be played in reproduction. These instructions allow the user to define a condition for triggering reproduction of the object in the space, and/or also the condition for playing the multiple objects when they are collocated within the same 3D space.

The instruction set also includes instructions for triggering the pictorial object for reproduction according to the above conditions.

Figure 4:
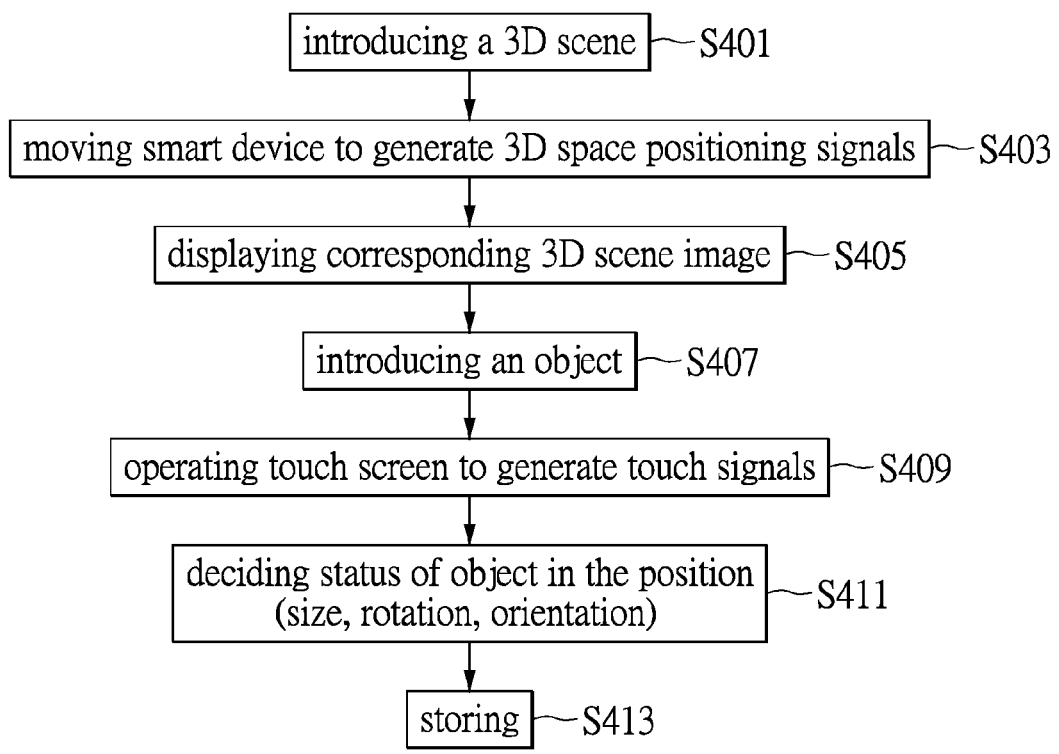
FIG. 4 shows a flow chart describing the method for editing a scene within a three-dimensional space in one embodiment of the present invention.

In the method for editing the scene in the three-dimensional space, the user is allowed to operate the smart device at a fixed point. The user is merely required to handhold the smart device for moving it over a 3D space. Reference is made to FIG. 4 describing the process of editing the 3D scene in one embodiment of the present invention.

In the beginning of the process, such as in step S401, a three-dimensional scene can be introduced. The three-dimensional scene may be an existing real scene, or a virtual scene that has been arranged. The 3D scene may also be a real scene of the 3D space that is captured by a camera module of the smart device in real time.

Next, such as in step S403, a set of spatial coordinates can be acquired by sensing the movement of the smart device within the 3D space. The spatial coordinates are preferably the positioning signals of the 3D space generated by a positioning sensor of the smart device. The positioning sensor is such as a gyroscope.

In step S405, the positioning signals due to the movement of the smart device are the reference for an editing program displaying the corresponding 3D images. A display screen of the smart device is used to display the 3D images that allow the user to see the scene with respect to the position where he wants to edit. In step S407, an object is selected using a program. The object can be a pictorial object with a specific shape, color, and/or pattern that is created by the editing program. For example, the user utilizes the smart device to edit the object within the 3D space at a first position. In step S409, the user operates a touch screen for defining status of the object, including position, e.g. the first position and relative position on the display screen, size, and rotary angle. For a three-dimensional object, the status of the object can include the object's orientation. The touch signals generated through the touch screen can be used to compute the space occupied by the 3D object. The object is edited by using a touch screen of the smart device so as to generate touch signals for defining status of the object within the three-dimensional space. Therefore, the status of the object at the first position can be obtained. Step S411 shows the status of the object within the 3D space such as size, rotary angle, or orientation, or in combination thereof.

In the last step S413, when the status of object at the first position is affirmed, the editing program stores a record including the images relating to the three-dimensional or plane object, and its spatial coordinates, status, and time at every moment.

Figure 5:
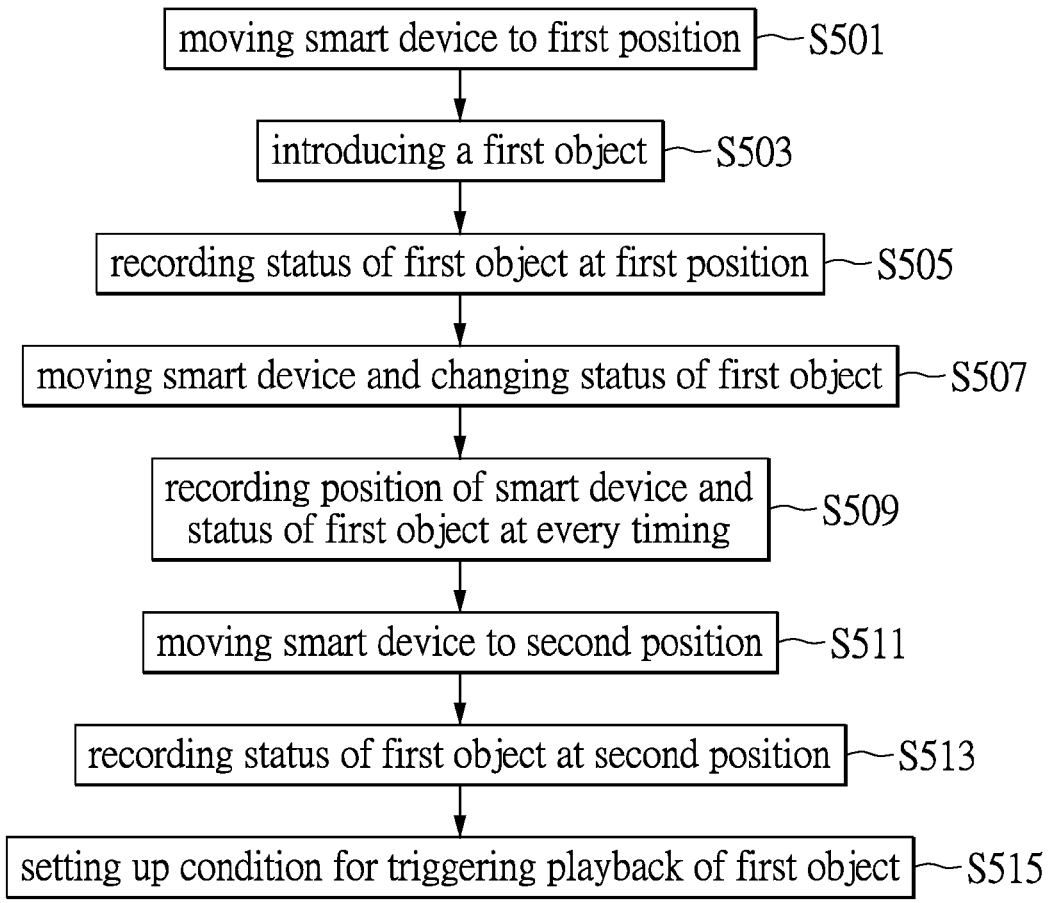
FIG. 5 shows a flow chart describing the method for editing a scene within a three-dimensional space in one further embodiment of the present invention.

The mentioned object can have not only the change of its status at a fixed position in the three-dimensional scene, but also a moving track when the position of the object is changed. FIG. 5 shows a flow chart that exemplarily describes the process of editing.

In a beginning step S501, the smart device is moved to a first position that can be an initial position. A set of spatial coordinates is generated through a sensor. Next, in step S503, a first object is introduced. The first object can be a static or animated image that can be a plane or a three-dimensional image. In step S505, the system records the status of the first object at the first position that is also the initial status of the object.

Next, in step S507, the smart device is moved, and status of the first object is changed. The system, through a program, records the position of the smart device at every moment, and the status of the first object, such as in step S509. In step S511, the smart device is moved to a second position. The movement of the smart device forms a moving track in the 3D space. In step S513, the system also records status of the first object at the second position. The system may record an end status and an end time if the second position is the last position of the first object in this example. The system simultaneously records continuous statuses of the first object when it moves from the first position to the second position. Then the system allows the user to set up a condition for triggering playback of the first object, such as in step S515.

In one embodiment of the present invention, the condition for triggering playing the first object for reproducing the animation of the object in the three-dimensional scene is at the moment the user moves the smart device to the initial position of the first object. Further, the condition for triggering playing the first object is at the moment the user touches the first object through the touch screen of the smart device. Still further, the condition for triggering playing the animation of the first object is the time reaching a preset time after the user starts watching the 3D scene.

The further embodiment of the present invention shows a method for editing the objects when more than one object is introduced to the three-dimensional scene. When multiple objects are arranged to the same three-dimensional space, the start time, end time, status of the object, and moving track for every object is individually configured. The conditions for triggering the objects can also be separately set.

Figure 6:
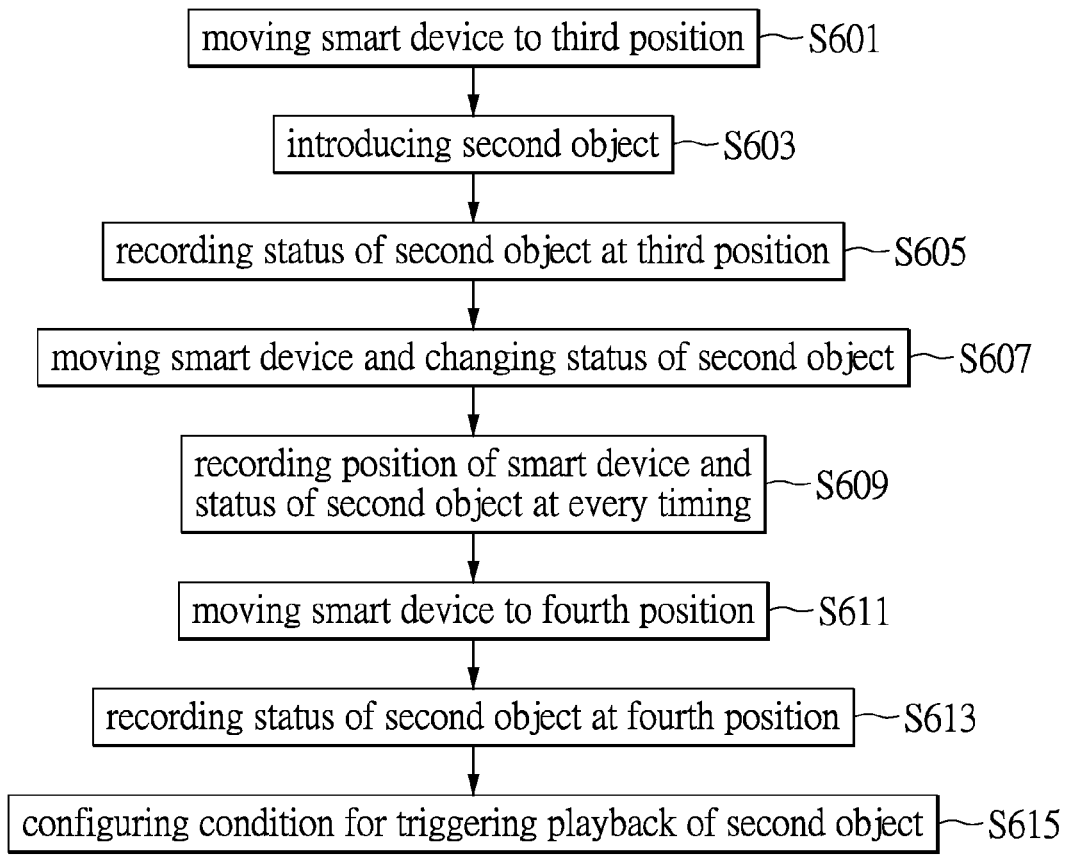
FIG. 6 shows a flow chart describing the method for editing a scene within a three-dimensional space in another one embodiment of the present invention.

Reference is next made to FIG. 6 showing a flow chart used to describe the method for editing the scene in the three-dimensional space. This exemplary process is described in a similar manner as following the steps in FIG. 5. After the first object has been edited, the smart device can be ready for editing one further object, i.e. a second object. Firstly, the smart device is moved an editing position for editing the second object. The editing position acts as a third position for the second object to be an initial position. It is noted that this third position, and its next fourth position, may not be excluded to directly or indirectly correlate with aforementioned first position and second position for the first object, such as in step S601.

At this moment, such as in step S603, the second object is introduced to the 3D scene. The second object can be a static or animated image, and can be a plane or three-dimensional image. Through the editing program executed in the smart device, the user can edit the second object through the touch screen. The size, rotary angle, and/or 3D orientation of the second object can also be edited. The editing program can first acknowledge the initial status of the second object at the third position according to the touch signals and the positioning signals. The system therefore is able to record the status of the second object at this moment, such as in step S605.

Next, such as in step S607, the user moves the smart device in the three-dimensional scene, and the smart device simultaneously generates positioning signals and correspondingly displays the 3D scene on the display screen. The movement of the smart device within the 3D space forms a moving track within a period of time, in addition the status of the second object is also changed. The moving track formed by the smart device operated by the user also acts as the moving track of the second object within this space. The user is allowed to edit the second object during the movement. In this process, such as in step S609, the system records the position of the smart device and the status of the second object in every timing. According to the user's arrangement, the smart device can be moved to the fourth position, i.e. the second object is brought to the fourth position. The status of the second object can be edited during this movement, such as in step S611. The system also records the status of the second object at the fourth position in view of the current positioning signals, such as in step S613.

After that, such as in step S615, the user can set up a condition for triggering the second object to be played. The system records and stores the variant statuses of the objects at different positions and the moving track among the positions.

It is worth noting that when the multiple objects are configured to be reproduced based on the aforementioned arrangements, exemplarily including statuses of the first object and second object within the three-dimensional scene, both the condition for triggering every individual object and the playback condition among the multiple objects can be edited by the user. In an exemplary example, the timing to trigger playing an individual object, e.g. the second object, is such as at the moment when the smart device is moved to the object's initial position, i.e. the third position of the second object. That means the animation of second object is triggered when the smart device is moved by the user to the third position. Further, the timing for triggering the animation of the second object is such as when the second object is touched by the user's finger through the touch screen. Still further, the timing for triggering the animation of the second object is at the moment that the user activates the smart device to watch the three-dimensional scene, in which, the animation is played with a preset time is met.

According to one embodiment, the condition for triggering the first object or the second object to be played is: using a touch screen of the smart device to touch the first object or the second object; using a display screen of the smart device to display the first object at the first position, or display the second object at the third position; starting to watch the three-dimensional scene for a preset time and then triggering the first object or the second object to be played; or starting to play the second object when starting to play the first object for the preset time.

In one further embodiment, when the user manipulates the smart device to see the first object at the first position through the display screen, the system may start to play the second object at a relative timing when the animation of the first object is triggered. Therefore, the system allows the user to arrange the time relationship, spatial relationship, and the conditions for triggering among the multiple objects within the same three-dimensional scene.

The user can see a range of scene within the 3D space through the display screen of the smart device when the three-dimensional scene is activated. It is possible to create an experience of viewing rather than the traditional way to see the plane image since the user can see two or more objects at one time; the user can see a part of any of the objects when he moves the smart device to watch the three-dimensional scene, or the user can watch the movement and variation of the object.

Figure 7:
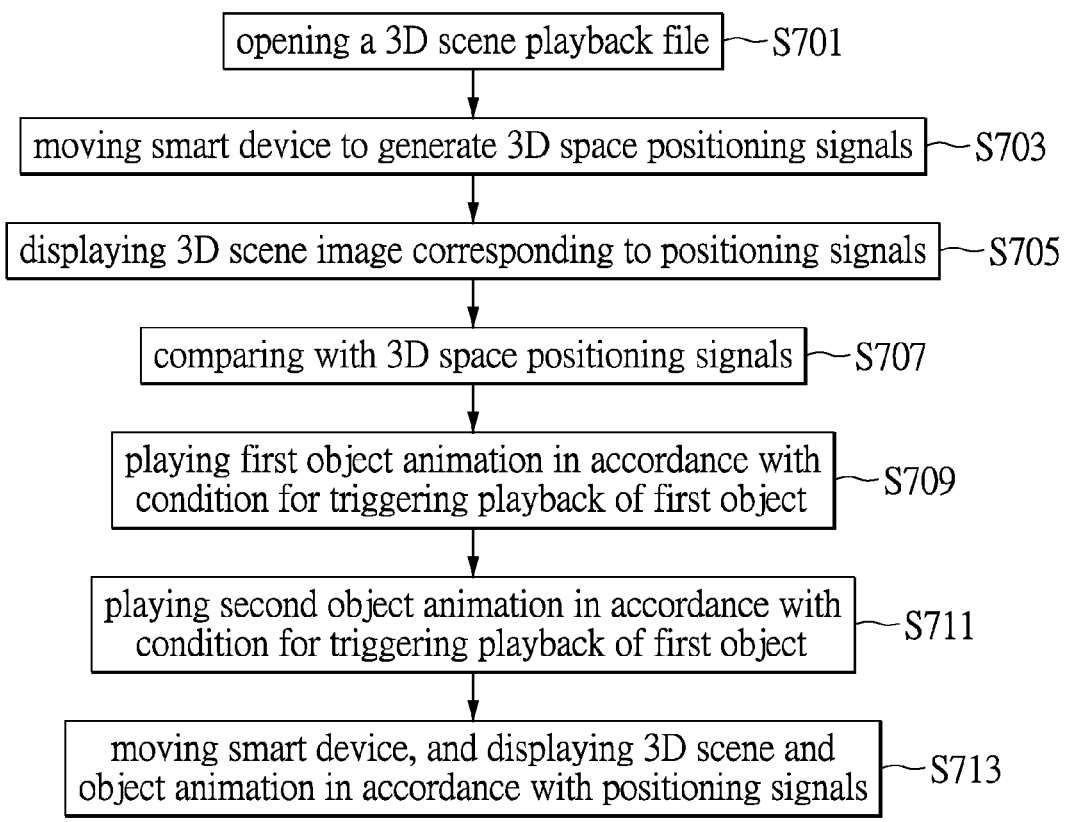
FIG. 7 shows a flow chart describing the method for editing a scene within a three-dimensional space in one further embodiment of the present invention.

For the system to play the three-dimensional scene, in one embodiment, a playback program executed in the smart device obtains the positioning signals of the 3D space generated by a sensor, e.g. a gyroscope, in the device. The positioning signals are referred to for detecting the spatial position of the smart device. The playback program displays the image of the 3D scene through the display screen in response to the positioning signals. When the smart device is moved to an initial position for an object, the animation of the object can be triggered based on the condition for triggering. When the object is triggered, the animation is played according to the moving track and the statuses set previously. The related process is exemplarily referred to in FIG. 7.

In the beginning, such as in step S701, a playback program opens a three-dimensional scene playback file, including the profile. The can operate the smart device, such as in step S703, to move the smart device and the positioning signals are simultaneously generated. Therefore, the user can browse the whole 3D scene through the display screen using the playback program. The scene is displayed in the display screen in response to the positioning signals, such as in step S705.

At this moment, the playback program acquires the positioning signals within the three-dimensional space, such as in step S707. The program compares the positioning signals with the relationship between the positions and images of the 3D scene stored in the playback profile, and also query the condition for triggering the object(s). In step S709, the playback program then plays the animation of the first object according to the condition for triggering the first object, and also brings out other objects if multiple objects exist. In step S711, the system may also refer to the condition for triggering the second object, if it exists. The animation of the second object is then played.

In any timing in the playback, such as in step S713, the user is allowed to move the smart device to any position and the playback program displays the corresponding scene and animations in response to the positioning signals. In particular, each of the multiple objects can be operated independently since every object is an independent object within the three-dimensional scene. Each object is associated with its individual playback condition. Therefore, the user can see more than one object within a specific scene at a time since the objects are under their own different conditions of playback. However, the objects may have a correlation relationship there-between, such as the condition for triggering. The user can set up the timing for initiating every object or the spatial relationship among the objects.

The condition for triggering the object is such as setting timing for triggering the objects according to a time relationship. For example, the second object is triggered after a preset time from when the first object starts to be played or finishes playing. The same rules may be applied to other objects. The condition for triggering the object is such as setting a spatial relationship. For example, the second object is triggered to be played when the first object arrives at a preset position in the 3D space. The same rules may also be suitable to other objects. The time relationship and the spatial relationship can be correlated with each other for configuring the condition for triggering objects.

Thus, according to the embodiments of the present invention, the method and system for editing a scene within the three-dimensional space allow the user to operate the smart device to edit the scene intuitively. The objects in the space can be edited by introducing a three-dimensional scene and it provides an intuitive way for editing the scene of the 3D space. When the images are reproduced, the user can freely operate the smart device to watch the 3D scene.

It is intended that the specification and depicted embodiment be considered exemplary only, with a true scope of the invention being determined by the broad meaning of the following claims.

What is claimed is:

1. A method for editing a scene within a three-dimensional space, comprising:
   positioning a smart device manipulated by a user within the three-dimensional space so as to generate a set of positioning signals that are generated by a positioning sensor of the smart device;
   introducing an object that is a pictorial object displayed on a display screen of the smart device within the three-dimensional space;
   editing the object at a first position within the three-dimensional space when the smart device is at the first position and acquiring the corresponding positioning signals defining the first position, so as to define a status of the object at the first position, wherein the status of the object indicates size of the object, rotary angle of the object or orientation of the object, or a combination thereof;
   editing the object at a second position when the object is moved with the smart device to the second position defined by the corresponding positioning signals generated by the positioning sensor of the smart device so as to define another status of the object at the second position and a moving track from the first position to the second position within the three-dimensional space for the object, and in which a series of continuous statuses over the moving track are produced; and
   storing the statuses of the object at the first position, the second position and the moving track within the three-dimensional space, and being ready to be played in reproduction.

2. The method according to claim 1, wherein, a three-dimensional scene is introduced before the object is edited, and the three-dimensional scene synchronized with positioning signals of the smart device within the three-dimensional space is displayed while the object is edited.

3. The method according to claim 1, wherein the object is edited by using a touch screen of the smart device so as to generate touch signals for defining status of the object within the three-dimensional space.

4. The method according to claim 3, wherein, a three-dimensional scene is introduced before the object is edited, and the three-dimensional scene synchronized with positioning signals of the smart device within the three-dimensional space is displayed while the object is edited.

5. A system for editing a scene within a three-dimensional space, operated in a smart device according to the method recited in claim 1, comprising:
   a 3D space positioning module, used to obtain positioning signals of the smart device with the three-dimensional space;
   an image processing module, used to process a pictorial object and a three-dimensional scene within the three-dimensional space, and generate a displayed image in response to positioning signals of the smart device within the three-dimensional space;
   a display module, used to output the displayed image within the three-dimensional space;
   a touch-sensitive module, providing a user interface for operating the pictorial object for defining a status of the pictorial object within the three-dimensional space; and
   a storage module, used to store the three-dimensional scene within the three-dimensional space and the status of the pictorial object within the three-dimensional space at a time and at a position;
   wherein, when the pictorial object is edited at a first position using the smart device within the three-dimensional space, so as to define the status of the pictorial object at the first position; when the pictorial object is edited at a second position by moving the smart device to the second position within the three-dimensional space, so as to define a moving track from the first position to the second position and a series of continuous statuses, including the moving track from the first position to the second position, of the pictorial object.

6. The system according to claim 5, further comprising an editing instruction set and a playback instruction set stored in a memory of the smart device, the instruction sets include:
   instructions for gaining positioning signals generated by the smart device within the three-dimensional space;
   instructions for displaying the three-dimensional scene in response to the positioning signals;
   instructions for editing status of the pictorial object at different positions and the moving track;
   instructions for recording change of statuses of the pictorial object at different positions and the moving track;
   instructions for setting condition for triggering the pictorial object to be played in reproduction; and
   instructions for triggering the pictorial object for reproduction.

7. The system according to claim 6, further comprising:
   instruction for synchronizing the three-dimensional scene introduced before the object is edited with the positioning signals of the smart device within the three-dimensional space.

8. The system according to claim 5, wherein the object is edited by using a touch screen of the smart device so as to generate touch signals for defining status of the object within the three-dimensional space.

9. A method for editing a scene within a three-dimensional space, comprising:
   generating positioning signals within a three-dimensional space by a positioning sensor of a smart device when a user manipulates moving the smart device;
   introducing a first object that is a pictorial object displayed on a display screen of the smart device within the three-dimensional space;
   editing the first object using the smart device at a first position within the three-dimensional space when the smart device is at the first position and acquiring the corresponding positioning signals defining the first position so as to define a status of the first object at the first position;
   editing the first object at a second position when moving the smart device with the first object to the second position defined by the corresponding positioning signals generated by the positioning sensor of the smart device for defining a series of continuous statuses of the first object from the first position to the second position within the three-dimensional space for the object;
   storing a first moving track when the first object moves from the first position to the second position, and the continuous statuses of the first object moving from the first position to the second position;
   introducing a second object that is also a pictorial object displayed on the display screen of the smart device within the three-dimensional space;
   editing the second object using the smart device at a third position within the three-dimensional space when the smart device is at the third position and acquiring the corresponding positioning signals defining the first position so as to define status of the second object at the third position;

editing the second object at a fourth position when moving the smart device with the second object to the fourth position defined by the corresponding positioning signals generated by the positioning sensor of the smart device for defining a series of continuous statuses of the second object moving from the third position to the fourth position within the three-dimensional space for the object;

storing a second moving track when the second object moves from the third position to the fourth position, and the continuous statuses of the second object moving from the third position to the fourth position; and setting conditions for triggering the first object and the second object to be played;

wherein the statuses of the first object and the second object indicate size of the object, rotary angle of the first or the second object or orientation of the object, or a combination thereof.

10. The method according to claim 9, wherein the condition for triggering the first object or the second object to be played is: using a touch screen of the smart device to touch the first object or the second object; using a display screen of the smart device to display the first object at the first position, or display the second object at the third position; starting to watch the three-dimensional scene for a preset time and then triggering the first object or the second object to be played; or starting to play the second object when starting to play the first object for the preset time.

* * * * *